United States Patent
Middlebrook

[15] 3,697,763
[45] Oct. 10, 1972

[54] ADJUSTABLE SPEED ELECTRIC POWER MEANS AND SYSTEM

[72] Inventor: Robert D. Middlebrook, 265 South Berkeley Avenue, Pasadena, Calif. 91107

[22] Filed: June 25, 1971

[21] Appl. No.: 157,018

Related U.S. Application Data

[63] Continuation of Ser. No. 844,853, July 25, 1969, abandoned.

[52] U.S. Cl. ..........................290/17, 318/8, 74/686
[51] Int. Cl. .............................................B60l 11/12
[58] Field of Search......318/361, 439, 8, 541, 41, 43; 290/17; 74/686

[56] References Cited

UNITED STATES PATENTS

| | | | |
|---|---|---|---|
| 1,515,322 | 11/1924 | Ahlm | 74/686 |
| 1,279,360 | 9/1918 | Altes | 318/361 |
| 1,648,698 | 11/1927 | Schrage | 318/361 |
| 2,018,336 | 10/1935 | Weischsel | 290/17 |
| 2,045,197 | 6/1936 | Neuland | 290/17 X |
| 2,085,763 | 7/1937 | Neuland | 290/17 |
| 2,763,823 | 9/1956 | Symec | 318/8 |

FOREIGN PATENTS OR APPLICATIONS

| | | | |
|---|---|---|---|
| 21,173 | 10/1904 | Great Britain | 318/8 |
| 16,644 | 6/1912 | Great Britain | 318/8 |

*Primary Examiner*—Benjamin Dobeck
*Attorney*—Charlton M. Lewis

[57] ABSTRACT

Electrical power means and system in which at least two D.C. dynamo-electric machines are electrically connected and mechanically drivingly connected through differential gearing with a common output shaft to provide an electro-mechanical loop configuration. Each of the machines has one or more sets of commutator brushes, and at least one of the machines is provided with a movable set of commutator brushes which are electrically connected with brushes of the other machine. Relative angular adjustment of the brush sets of the machines produces smooth concomitant changes in the speed of the output shaft in one direction from zero to a maximum. The continuously connected electrical connections between the machines enable automatic dynamic braking and regeneration without the necessity of switching operations.

14 Claims, 19 Drawing Figures

PATENTED OCT 10 1972

ROBERT D. MIDDLEBROOK
INVENTOR
WHANN & McMANIGAL
Attorneys for Applicant
BY

ROBERT D. MIDDLEBROOK
INVENTOR
WHANN & McMANIGAL
Attorneys for Applicant
BY

ROBERT D. MIDDLEBROOK
INVENTOR
WHANN & McMANIGAL
Attorneys for Applicant
BY

ADJUSTABLE SPEED ELECTRIC POWER MEANS AND SYSTEM

This application is a continuation of Ser. No. 844,853, dated July 25, 1969, now abandoned.

BACKGROUND OF THE INVENTION

The present invention relates generally to the field of speed control of rotating electrical machines.

A conventional electric motor connected to a constant electrical supply is basically a constant-speed machine and, at best, its output speed can be controlled over a restricted range that does not include zero. Many applications of electric motors, however, require one or more of the following desirable performance properties: output speed controllable over a wide range in either direction of rotation including, particularly, zero speed, regardless of the direction of load torque; and automatic reversal of direction of power flow to provide dynamic braking. In addition, it is desirable that these performance properties should be obtainable with minimal power loss under any condition of operation, and that the physical size and weight of the unit should not substantially exceed those of a conventional motor that would deliver the required power.

In the long history of the prior art, many systems embodying dynamo-electric machines have been proposed by which one or more of the desirable variable and controllable performance properties may be realized. However, even those systems that afford acceptable performance properties have been found impractical or uneconomical because of a variety of inherent deficiencies, such as low efficiency, excessive size and weight in relation to system power rating, unreliability, unavailability in sufficiently high power rating, and the like.

The present invention embodies a new and improved system, utilizing electrically and mechanically connected rotating dynamo-electric machines in an electro-mechanical loop configuration, whereby the speed of a connected mechanical load may be smoothly and continuously controlled over a wide range, including zero, regardless of the direction of the load torque, and wherein the losses in any condition of adjustment, and the overall size and weight of the system, do not substantially exceed those of a single conventional dynamo-electric machine capable of transducing the same maximum power. Moreover, the system may be constructed for a power rating as high as that for which a conventional dynamo-electric machine can be constructed.

One form of system embodying the present invention may be used to convert electrical power at constant D.C. or A.C. voltage into mechanical power at variable speed, and conversely, mechanical power at variable speed to electrical power at constant D.C. or A.C. voltage. In such a form, the system would find use, for example, as a combined motor and variable-speed transmission unit in electrically operated vehicles, in electric trains, and in industrial machinery in which precise speed control is required. In all such applications, automatic regenerative braking is available, with consequent economy of the energy drawn from the electrical source, which is a particular advantage when the electrical source is a battery.

Another form of system embodying the present invention may be used to deliver mechanical power at speeds controllably variable over a wide range, from a source of mechanical power, or prime mover, whose speed is substantially constant or variable over only a limited range. In such a form, the system would find use, for example, as a variable-speed transmission unit in a diesel-electric train, and in a "hybrid" automobile in which the power source may be a prime mover or a battery, or both.

Other forms of systems embodying the present invention that include modified performance features will be discussed in the later detailed descriptions.

The desirable system criteria mentioned above may be realized simultaneously in a system embodying the present invention, and may be expressed specifically and in more detail as follows:

1. Controllable Speed Criterion. Smooth and continuous control of the load speed between designed limits may be obtained, in any combination with load torque between the limits of maximum forward and maximum reverse torque. The designed load speed range may be from a minimum to a maximum in the forward direction, from zero to a maximum in the forward direction, or from a maximum in the reverse direction, through zero, to a maximum in the forward direction. Electrical switching that is required in some forms of the invention to provide certain designed speed ranges does not give rise to jerky operation or discontinuities in speed or torque.

2. No Excess Power Loss Criterion. In any condition of operation, there are no excess power losses over and above the power losses inherent in the normal operation of the incorporated dynamo-electric machines, gear trains, bearings, and other associated parts. That is, the above-mentioned Controllable Speed Criterion is achieved without the introduction, at any load speed or torque, of any extra electrical or mechanical resistance that would result in excess power loss. This feature is of particular significance under conditions in which the mechanical load is stalled or is rotating at low speed: the maximum torque can be continuously applied to the load, and yet the power source is called upon to provide only the inherent power losses.

3. Automatic Dynamic Braking Criterion. The direction of power flow through the system is automatically reversible, without change in the electrical or mechanical configuration or adjustments, so that an overhauling load is automatically braked. Under automatic dynamic braking conditions, the power extracted from the load is either dissipated externally, or is returned to the power source in forms of the system in which the power source is capable of absorbing such power (regenerative braking). The automatic dynamic braking feature is of particular importance when the load must not be allowed to coast, as in elevator, crane, and fork-lift truck power units. The regenerative braking feature is of particular importance when the energy of the power source must be conserved, as in battery operated vehicles.

4. High Transducer Utilization Efficiency Criterion. The system is capable of transducing a maximum power substantially equal to the sum of the power transducing capabilities of the incorporated dynamo-electric machines. That is, the power rating of the system is substantially equal to the sum of the power ratings of the incorporated dynamo-electric machines, or equivalently, the system is of substantially the same size and weight as a conventional single dynamo-electric machine of the same power rating. All the incorporated transducer components are capable of delivering simultaneously their maximum rated powers, thus providing high transducer utilization efficiency, and no incorporated transducer component is used solely, either wholly or in part, for a control function. This feature is of overriding importance from an economic point of view, since the capital cost of a transducer system is roughly proportional to the sum of the power ratings of the incorporated transducer components. Many systems described in the prior art, and even in practical use, incorporate transducer components with power ratings whose sum is two, or even three times the power rating of the system. Considerable economic advantage is thus to be obtained if such a system is replaced by a system of equal overall power rating that embodies the present invention.

Heretofore, there have been many attempts in the prior art to construct apparatus, and particularly a motor-transmission system that would meet one or more of the above-enumerated Criteria. However, such attempts fail to meet all of the four Criteria simultaneously.

For example, a simple method of speed control is to insert resistance in series with a D.C. motor; this introduces power loss, and therefore does not meet the Excess Power Loss Criterion.

Interchange of motors between series and parallel connections, long used on electric trains, involves discontinuities in control and therefore does not meet the Controllable Speed Criterion.

The Ward-Leonard system, which constitutes a standard system for diesel-electric locomotives, requires dynamo-electric machines of total power rating at least twice the rated traction power, and therefore does not meet the High Transducer Utilization Criterion.

Systems in which the electrical power supplied to a conventional motor is chopped, or otherwise modified (for example, the "solid-state pulse control" systems), suffer from several deficiencies. They do not permit automatic reversal of the direction of power flow, and therefore do not meet the Automatic Dynamic Braking Criterion. The electronic control is of such high cost as to make the system equivalent, from an economic point of view, to one of much higher power rating than it is actually capable of delivering, and so does not meet the High Transducer Utilization Criterion. Furthermore, such solid-state pulse control systems are impractical, technically as well as economically, in power ratings above a few horsepower.

The present invention overcomes the inherent disadvantages and operational problems in the heretofore known prior art structures, and provides an apparatus and system that is able simultaneously to meet all the four above-delineated Criteria, and that may be embodied in units having power ratings comparable to conventional electric motors. Typical of the wide horsepower range and different fields of application in which a system able simultaneously to meet all the four above-delineated Criteria can be used to advantage are: electric vehicles such as wheel chairs, golf carts, utility vehicles, materials handling equipment, electric automobiles, and electric trains; machine tools and industrial machinery, cranes, and elevators.

SUMMARY OF THE INVENTION

The present invention relates to variable speed power means and systems utilizing electrically and mechanically interconnected dynamo-electric machines, and which is particularly adapted for use as power and transmission apparatus, and with associated systems involving a variety of different types of prime movers.

It is therefore a general object of the present invention to provide unitary electro-mechanical apparatus which has wide application as means for driving variable mechanical loads from a variety of power sources, and which inherently embodies transmission and controllable speed characteristics.

A further object of the present invention is to provide a unique variable speed and torque transmission system utilizing a pair of dynamo-electric machines, mechanically linked by suitable transmission means such as two members of a planetary or differential gearing, and electrically linked by connection between adjustable brush pairs in such a way as to form an electro-mechanical loop, and in which electrical or mechanical power input to or output from the loop is obtained at one machine, and mechanical power output from or input to the loop is obtained at a shaft connected to the third member of the planetary or differential gearing, and wherein the direction and speed of rotation of the shaft is controlled by the positions of the adjustable brush pairs.

A further object of the present invention is to provide an apparatus and system of the foregoing type, wherein the smooth and continuous control of load speed is effected without the introduction of excess power losses over and above the power losses inherent in the normal operation of the incorporated dynamo-electric machines, gear trains, bearings, and other associated parts.

A further object of the present invention is to provide an apparatus and system of the foregoing type, wherein the direction of power flow through the system is automatically reversible, without change in the control speed setting, so that automatic dynamic braking of a connected mechanical load is obtained.

A still further object of the present invention is to provide an apparatus and system of the foregoing type in which high transducer utilization efficiency is achieved, in that the power rating of the system is substantially equal to the sum of the power ratings of the incorporated dynamo-electric machines, so that smooth and continuous control features are achieved without penalty in size and weight over and above the size and weight of a conventional single dynamo-electric machine of the same power rating but not incorporating such control features.

It is another object of the present invention to provide an apparatus and system of the foregoing type in which all the above-mentioned objects are simultaneously achieved, and in which electrical power at constant D.C. or A.C. voltage may be controllably converted to mechanical power at variable speed, and conversely mechanical power at variable speed may be controllably converted to electrical power at constant D.C. or A.C. voltage, so that automatic regenerative braking occurs.

Further objects and advantages of the present invention will be brought out in the following parts of the specification, wherein the detailed description is for the purpose of fully disclosing several embodiments of the invention without placing limitations thereon.

BRIEF DESCRIPTION OF THE DRAWINGS

Referring to the accompanying drawings, which are for illustrative purposes only.

DESCRIPTION OF THE DISCLOSED EMBODIMENTS

A. The Basic System

Figure 1:
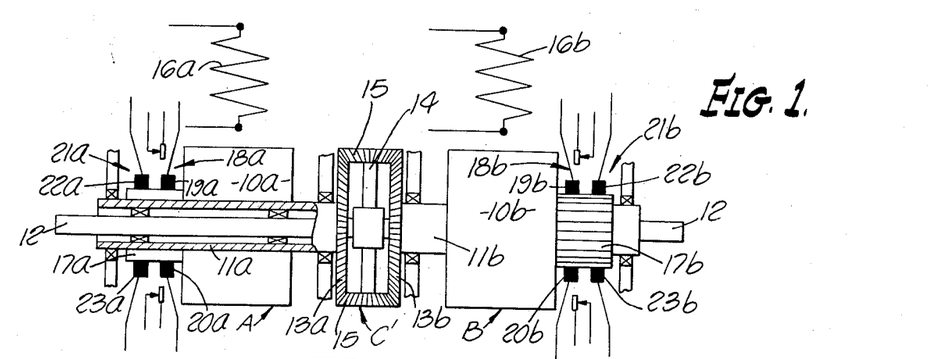
FIG. 1 is a view in elevation diagrammatically depicting apparatus embodying the concept of the present invention.

For illustrative purposes, the present invention is shown in FIG. 1 as embodying two similar two-pole D.C. dynamo-electric machines A and B, respectively having rotatable armatures 10a and 10b mounted upon rotatable shafts 11a and 11b in axial alignment. The respective shafts are connected with a common load shaft 12 through transmission means in the form of a differential gear assembly C', the shaft 11a being connected with a sun gear 13a, and the shaft 11b being connected with a sun gear 13b. The shaft 12 carries a spider structure 14 which supports a plurality of differential idler gears 15 having meshed relation with the sun gears. With this arrangement, the two dynamo-electric machines are mechanically coupled, and thus cooperatively determine the speed and direction of rotation of the common load shaft 12.

Figure 2:
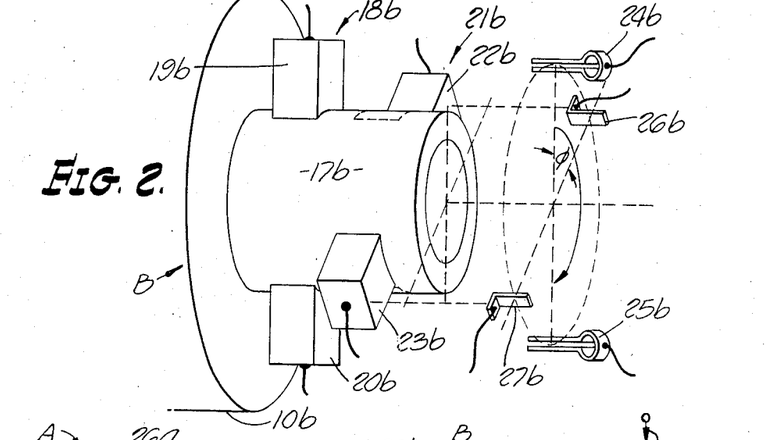
FIG. 2 is an enlarged fragmentary exploded perspective view diagrammatically showing details of a brush and switch arrangement of one of the dynamo-electric machines according to the present invention.

The dynamo-electric machines respectively have associated magnetic field structures, which have been illustrated as comprising separately but equally excited field windings 16a and 16b respectively. The armature windings of the respective machines are brought out to commutators as indicated at 17a and 17b. Two sets of brushes, 18a and 21a, are shown operatively associated with the commutator 17a of machine A, and similarly, two sets of brushes 18b and 21b are shown associated with the commutator 17b of machine B. The brushes of each pair are diametrically positioned with respect to the commutator, and the diametral axis containing a brush pair will be referred to as the brush axis. The relationship between the two sets of brushes on each machine will be more clearly understood by reference to FIG. 2, which refers to machine B. The brush axis of one or both sets of brushes is arranged to be movable in angular position with respect to the field structure.

Before a description of the electrical connections and the system operation is given, it is desirable to summarize certain important relevant properties of the individual dynamo-electric machines in order to establish suitable nomenclature. The summary will be given in relation to machine B.

If machine B were to be operated as a D.C. motor, one brush pair, say 21b, would be omitted, and the remaining brush pair 18b would be connected to a constant D.C. supply voltage. In conventional operation, the brush axis would be placed in the electrical null position with respect to the field, and the armature would rotate at a certain speed. For convenience in the following description, the electrical null position of the brushes will be referred to as the normal position, and the armature will be said to rotate at the normal speed $w_n$, when the brushes are connected to a D.C. voltage E and their axis is in the normal position, and when the field excitation current is at its normal (maximum) value $i_n$.

Two features of the operation of the machine are employed in the various forms of the present invention.

i. The armature rotation speed can be increased above its normal value $w_n$ either by decreasing the field excitation current, or by displacing the brush axis from its normal position, or by both methods simultaneously. A simple approximate expression for the speed $w_r$, designated the reference speed, when the field excitation current is $i$ and the brush axis is at an angle $\theta°$ with respect to the normal position, is $$w_r = \frac{i_n}{i} \frac{1}{1-(\theta/90)} w_n \qquad (1)$$

Although the maximum torque obtainable at the shaft of the machine is decreased by the same factor that the speed is increased, the maximum power that the machine is capable of transducing is essentially constant, except that the inherent mechanical losses are somewhat greater at higher speeds. It is obvious that the field excitation current must not be allowed to go to zero, nor must the angle $\theta$ be allowed to approach 90°, otherwise the speed would tend to infinity.

ii. The voltage V that appears between the brushes of the second pair $21b$ is a maximum when the brush axis is in the normal position, decreases to zero when the axis is at 90° from the normal position, and increases to the same maximum value with opposite polarity when the axis is 180° from the normal position. The maximum value of V, which will be designated the reference voltage $E_r$, is determined by the angle $\theta$ of the axis of the brush pair $18b$:

$$E_r = \frac{1}{1-(\theta/90)} E \qquad (2)$$

A simple approximate expression for the voltage $V$ between the brushes of pair $21b$, when the axis of pair $21b$ is at an angle $\phi$ from the normal position, is $$V = [1-(\phi/90)]E_r = \frac{1-(\phi/90)}{1-(\theta/90)} E \qquad (3)$$

Figure 3:
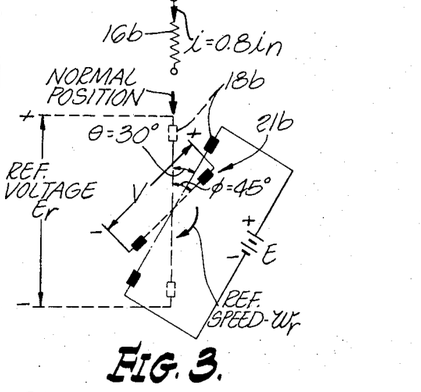
FIG. 3 is a view diagrammatically illustrating the voltage changes resulting from certain changes in the relative angular setting of the brush sets on one of the machines.

An example of a specific combination of brush axis angles $\theta$ and $\phi$ and field excitation current $i$ is illustrated in FIG. 3, in which for convenience the brush pair $21b$ is shown at a smaller diametral distance than the brush pair $18b$. The constant supply voltage $E$ is connected to the brush pair $18b$, whose axis is at an angle $\theta = 30°$ from the normal position. The reference voltage $E_r$ is thus $$E_r = \frac{1}{1-(30/90)} E = 1.5E$$

The axis of the brush pair $21b$ is at an angle $\phi = 45°$ from the normal position, so the voltage $V$ between these brushes is $$V = [1-(45/90)]1.5E = 0.75E$$

The assumed field $16b$ excitation current $i$ is $0.8i_n$, so the reference speed $w_r$ of the armature is $$w_r = \frac{1}{0.8} \frac{1}{1-(30/90)} w_n = 1.25 \times 1.25 w_n = 1.875 w_n$$

The above summary of relevant properties of machine B applies in corresponding form to machine A.

The electrical connections and the operation of a particular embodiment of the invention, to be referred to as the basic system, will now be described. In the basic system, machines A and B are substantially identical, and the field excitation current of each is maintained constant at its normal value $i_n$. One brush pair on each machine, which will be taken to be pair $18a$ on machine A and pair $18b$ on machine B, remains fixed with its axis in the normal position, so that the angle $\theta$ is zero, and the other brush pair on each machine, $21a$ and $21b$ respectively, is movable in angular position so that the angle $\phi$ between the brush axis and the normal position can be varied. On each machine, switching arrangements are included to provide electrical interconnections determined by the relative angular positions of the axes of the fixed and movable brush sets. Such switching arrangements may be accomplished in various ways, but for illustration, with respect to machine B as in FIG. 2, a set of diametrically positioned fixed contact elements $24b$ and $25b$ may be supported on the brush rigging (not shown) which supports the brushes $19b$ and $20b$. The diametric axis of these contacts registers with the axis of the fixed brush set. In a similar manner, cooperable switch contacts $26b$ and $27b$ are carried by the brush rigging (not shown) which supports the movable brushes $22b$ and $23b$. As thus arranged, it will be evident that when the axis of the movable brush set is parallel or antiparallel with the axis of the fixed brush set, the switch contacts are engaged, while in the intermediate angular positions of the movable brush axis with respect to the fixed brush axis the contacts are disengaged. A similar switching arrangement is provided on machine A.

As will be described in detail below, rotation of the movable brush axis on one machine away from the normal position, while a constant voltage is connected to the fixed brush set of the same machine and the axis of the movable brush set of the other machine remains in the normal position, causes the speed of the load shaft 12 to increase from zero in one direction. Similarly, if the roles of the two machines are interchanged, the load shaft speed may be increased from zero in the opposite direction.

The electrical connections and operation of the basic system will now be explained in detail, with reference to FIGS. 4 through 8.

As illustrated, a source 28 of constant voltage E, such as a battery, has its positive terminal connected to switch contacts $24a$ and $24b$, while the negative terminal is connected with switch contacts $25a$ and $25b$. A conductor 29 connects switch contact $26a$ with fixed brush $19b$, and a conductor 30 connects switch contact $26b$ with fixed brush $19a$. Similarly, a conductor 31 connects switch contact $27a$ with fixed brush $20b$, while a conductor 32 connects switch contact $27b$ with fixed brush $20a$. Movable brushes $22a$ and $22b$ are connected by a conductor 33, while movable brushes $23a$ and $23b$ are connected by a conductor 34.

Figure 4:
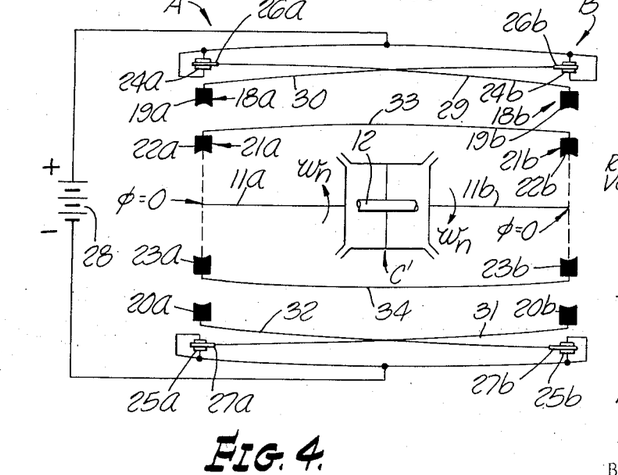
FIGS. 4, 5, 6, 7 and 8 are successive views schematically representing different operating adjusted positions of the movable brushes for adjusting the operating speed.

In FIG. 4, the angle $\phi$ of the movable brush axis is zero in both of the machines A and B. Under such conditions, all four switches are closed and the full voltage E is applied to the fixed brushes on both of the machines, which therefore operate as motors to turn their respective shafts $11a$ and $11b$ in opposite directions at their normal speeds $w_n$, it being understood that the respective fields of the two machines are arranged with their polarities in proper relation to produce such rotation. With the two machines rotating oppositely at equal speeds, the differential gearing C' holds load shaft 12 stationary.

The switching contacts are not necessary to produce this operation, but such contacts have certain advantages, which will be explained later. If the contacts are omitted, the D.C. supply voltage E is applied directly to the fixed brushes $19b$ and $20b$ of machine B, and this machine then operates as a motor at its normal speed $w_n$. Since the angle of the movable brush axis on this machine is zero, the voltage which appears across the movable brushes $22b$ and $23b$ is also equal to the supply voltage E, and this voltage is also applied to the movable brushes $22a$ and $23a$ of machine A. Since the angle of the movable brush axis on this machine is also zero, machine A also operates at its normal speed $w_n$. Therefore, whether the switch contacts are employed or not, the reference voltage $E_r$ of each machine is equal to E, the reference speed $w_r$ of each machine is equal to the normal speed $w_n$, and both machines operate at their reference speed $w_n$ in opposite directions, so the load shaft 12 remains stationary and no power is transmitted to a connected mechanical load at rest. With neglect of inherent power losses, no current is drawn from the battery 28.

Figure 5:
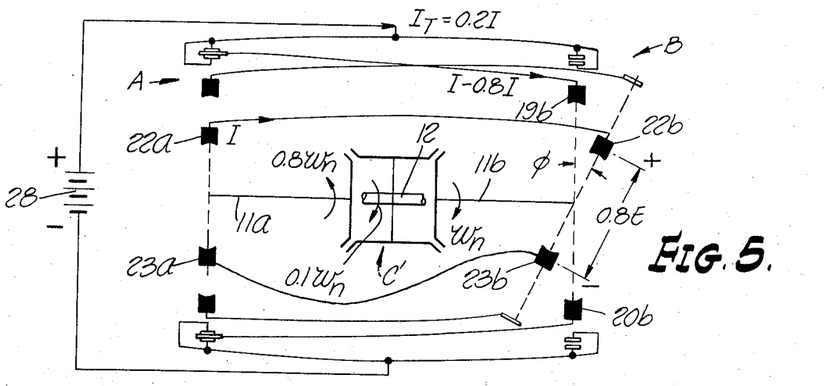

In order to cause rotation of the load shaft in a forward direction, the angle $\phi$ of the movable brush axis of machine B is increased from zero, but the axis of the movable brush set of machine A is left in its normal position, as shown in FIG. 5. The supply voltage E is still applied to the fixed brushes 19b and 20b in the normal position, so that machine B continues to rotate at the normal speed $w_n$. The voltage across the movable brushes 22a and 23a of machine A is the same as the voltage across the movable brushes 22b and 23b of machine B, which is now derived from the commutator and is less than E according to Equation (3). For the example shown in FIG. 5, the angle of the movable brush axis of machine B is taken to be $\phi = 18°$, so that the voltage between the movable brushes 22b and 23b is $V = 0.8E$. This same voltage appears across the brushes 22a and 23a of machine A in the normal position, so that the rotational speed of machine A is reduced to $0.8w_n$. With the sun gears of the differential gear C′ now rotating in opposite directions but at unequal speeds $w_n$ and $0.8w_n$, respectively, the load shaft 12 now rotates at a speed $(½)(w_n − 0.8w_n) = 0.1w_n$ in the forward direction.

If mechanical power is required to be delivered to the load shaft 12, a concomitant torque is developed. With neglect of inherent power losses in the differential gear, equal torques exist in the shafts 11a and 11b. Therefore, since the field excitations are equal, the armature current I required to produce the torque is the same in each machine. The directions of these currents, however, should be carefully noted. Machine B is operating as a motor, converting electrical energy to mechanical energy, while machine A, driven via the differential gearing, is operating as a generator, converting mechanical energy to electrical energy. Thus, the mechanical output power of machine B is delivered partly to the load, and partly to machine A where this portion of the mechanical output power of machine B is converted back to electrical power. This reconverted electrical power is not wasted, but is fed back into machine B through the movable brushes 22b and 23b, and thus subtracts from the total electrical power required from the D.C. source 28. For the assumed brush angle shown in FIG. 5, the generated current $I$ in machine A is fed back into the D.C. supply as a current $0.8I$, so that the net or total current $I_T$ required from the D.C. supply is the current $I$ required by machine B acting as a motor, minus the returned current $0.8I$ from machine A acting as a generator, which may be expressed as follows:

$$I_T = I − 0.8I = 0.2I$$

In terms of power flow, it may be stated that of the total mechanical output power of machine B, 20 percent is delivered to the load shaft 12, and 80 percent is delivered to machine A where it is reconverted to electrical power and used to provide 80 percent of the electrical power input required for machine B. Thus 80 percent of the power transduced by machine B is circulated between machine B and machine A. The remaining 20 percent is drawn from the D.C. supply, and is delivered to the load shaft 12. Consequently, the D.C. supply is called upon to provide only the power delivered to the shaft 12, although the shaft has been controlled to rotate at only $0.1w_n$.

The manner in which the load shaft 12 is caused to rotate, and a torque delivered to the load, described above with reference to FIG. 5, illustrates the essential functions of the various parts of the basic system. Power is circulated round an electro-mechanical loop consisting of, in sequence, the armature of B, the differential gear, the armature of A, a brush set of A, the movable brush set of B, and back to the armature of B. Power required by the mechanical load is extracted from the loop at the differential gear, and is restored to the loop at the armature of B by conversion of electrical power supplied from the electrical source connected to the fixed brush set of B. The reference speed $w_r$ is determined by the angle $\theta$ of the fixed brush set 18b, and the speed of the load shaft is determined jointly by the reference speed and the angle $\phi$ of the brush set 21b. Although in the basic system as described the brush set 18b is fixed and the brush set 21b movable, in some of the modified systems to be described later their roles may be reversed, or both sets may be movable, and it is desirable to distinguish the two sets according to their functions. Accordingly, the brush set whose angle determines the reference speed will be referred to as the reference brush set, and the set whose angle determines the load speed will be referred to as the loop-adjusting brush set. In the basic system, the axis of the reference brush set is in the normal position, so the angle $\theta$ is zero. Since the loop-adjusting brush set is used for controlling the output speed, it may also aptly be called the control brush set.

Figure 6:
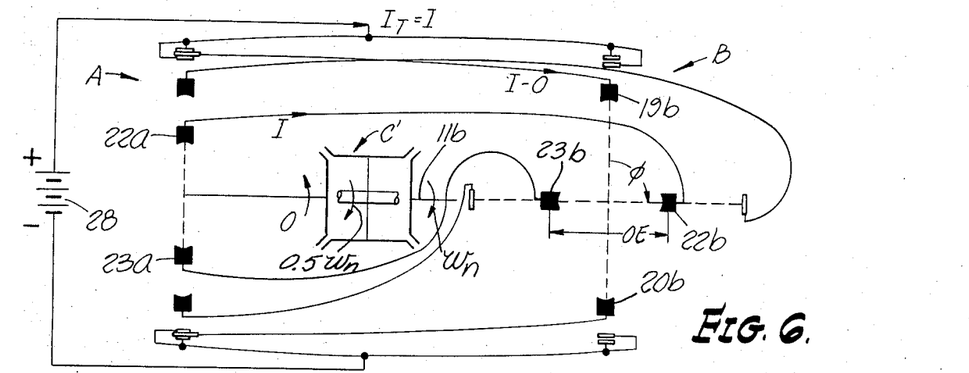

The load shaft 12 may be caused to rotate more rapidly in the forward direction by increasing the angle $\phi$ of the loop-adjusting brush set of machine B. Such a condition is shown in FIG. 6, which is similar to that of FIG. 5 except that the brush angle $\phi$ has been increased to 90°. Machine B continues to rotate at the normal speed $w_n$, but at $\phi = 90°$ the voltage V between the brushes 22b and 23b is zero, according to Equation (3). The voltage between the brushes 22a and 23a of machine A is therefore also zero, and so its shaft 11a does not rotate. Under such conditions, the speed of the load shaft 12 is $(½)(w_n − 0) = 0.5w_n$. Again, if load torque is required, equal armature currents flow in the two machines. However, since machine A is not rotating, this machine will not return any electrical power to machine B, and the total current $I_T$ required from the D.C. supply is the current $I$ required by machine B minus zero returned current from machine A, which may be stated as follows:

$$I_T = I − 0 = I$$

It is therefore seen that 100 percent of the mechanical output power of machine B is delivered to the shaft 12, and none is delivered to machine A. Thus, 100 percent of the power transduced is drawn from the D.C. supply and is delivered to the load, and none is circulated round the electro-mechanical loop (although there is still a circulating current). Again, it is seen that the D.C. supply is called upon to provide only the power delivered to the load shaft 12, although the output shaft has been controlled to rotate at only $0.5w_n$.

Figure 7:
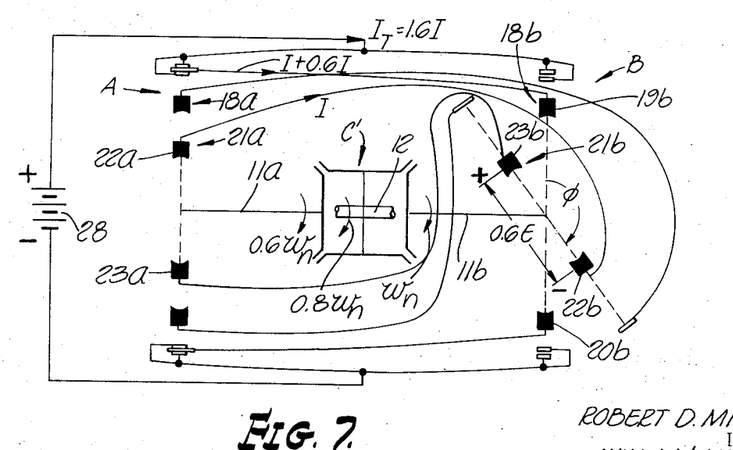

The speed of shaft 12 may be further increased in the forward direction by further increasing the angle $\phi$ of the loop-adjusting brush set of machine B, as shown in FIG. 7. It will be observed, however, that as the brushes are moved beyond the position shown in FIG. 6, the polarity of the voltage between the loop-adjusting brushes of machine B is reversed. In the condition assumed in FIG. 7, the angle $\phi$ is 144°, so the voltage supplied to machine A is $-0.6E$, according to Equation (3). The direction of rotation of its shaft 11a is therefore reversed, and under these conditions the shaft 12 is caused to rotate at a speed $(\frac{1}{2})(w_n + 0.6w_n) = 0.8w_n$. Also, under these conditions a torque at the shaft 12 causes equal armature currents in the two machines. However, since the direction of rotation of the shaft 11a of machine A is now reversed, both machines operate as motors and convert electrical energy to mechanical energy. Under the conditions assumed in FIG. 7, the motoring current $I$ in machine A is drawn from the D.C. supply as a current $0.6I$, so that the total current $I_T$ required from the D.C. supply is the current $I$ required by machine B operating as a motor, plus the current $0.6 I$ required by machine A also operating as a motor, expressed as follows:

$$I_T = I + 0.6I = 1.6I$$

It is thus seen that under these conditions, 63 percent of the mechanical power delivered to the shaft 12 is transduced by machine B and 37 percent is transduced by machine A. Again, the power source is called upon to provide only the power delivered to the load shaft 12, although the shaft has been controlled to rotate at only $0.8w_n$.

Figure 8:
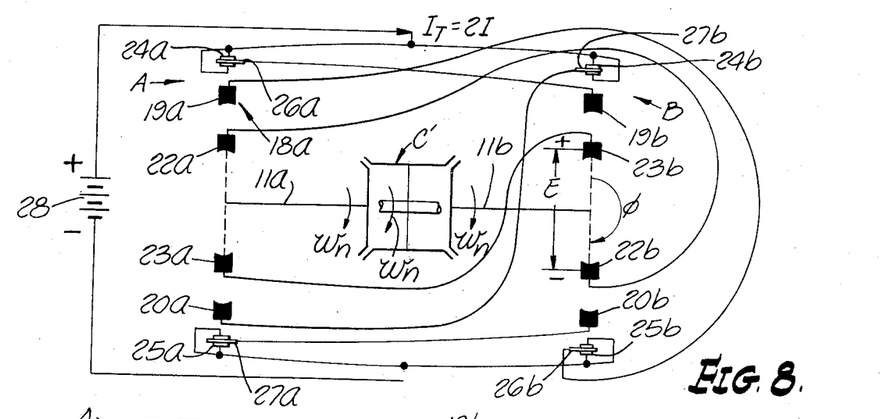

In FIG. 8, the conditions are shown for producing maximum speed in the forward direction by increasing the loop-adjusting brush angle $\phi$ to 180°. In general the conditions are the same as those shown in FIG. 7 except that the voltage between the brushes 22a and 23a of machine A is equal in magnitude and opposite in polarity to the D.C. supply voltage E. Consequently, the rotational speed of shaft 11a is $w_n$ and in the same direction as that of shaft 11b. Under these conditions, the load shaft 12 rotates at a speed $(\frac{1}{2})(w_n + w_n) = w_n$ in the forward direction. If a torque is required at the load shaft, equal armature currents are again produced in the two machines, and both machines act as motors converting electrical energy to mechanical energy. The total current $I_T$ required from the D.C. supply is the current $I$ required by machine B acting as a motor, plus the current $I$ required by machine A acting as a motor, expressed as follows:

$$I_T = I + I = 2I$$

Thus it is apparent that 50 percent of the mechanical power delivered to the load shaft 12 is transduced by machine B and 50 percent is transduced by machine A. Thus, since the two machines are identical, the maximum available load power is the sum of the maximum rated powers of the two machines, so that maximum transducer utilization efficiency is achieved.

From the foregoing description, it will be apparent that the speed of the load shaft 12 can be smoothly increased from zero to maximum speed in the forward direction by changing the movable brush angle $\phi$ of machine B from 0° to 180°, while retaining the movable brush angle of machine A at 0°. Since the embodiment is symmetrical, both mechanically and electrically with respect to machine A and machine B, it will now be evident that the speed of shaft 12 can be similarly increased from zero to maximum in the reverse direction by changing the movable brush angle $\phi$ of machine A from 0° to 180°, while retaining the movable brush angle of machine B at 0°. It will be appreciated, of course, that for reverse rotation the D.C. supply is directly connected to the fixed brushes 19a and 20a of machine A, and that the fixed and movable brush sets of machine A correspond respectively to the reference and loop-adjusting brush sets.

In the above description of the operation, it has been assumed that a constant load torque is required, and therefore the power delivered to the load increases in proportion to the adjustable load speed. It should be noted that under this condition the net current $I_T$ required from the D.C. supply also increases in proportion to the load speed, and so also does the power required from the power source. It may therefore be concluded that, apart from the inherent power losses, all the power extracted from the power source is delivered as mechanical power to the load at any load speed, and there are no excess power losses.

The foregoing conclusion also applies if the load torque is not constant. At any speed, the power extracted from the power source is only that delivered to the load, and there are no excess power losses.

Similarly, if the load torque is negative, that is, if the load is overhauling, the direction of power flow through the system is automatically reversed, and the load is braked. At any speed, the power extracted from the load is returned to the power source (except for the inherent power losses), and is not wasted.

From consideration of the operation as described above, it is apparent that there are four operating conditions, which may be stated as follows: (a) machine B operates as a motor and machine A as a generator; (b) machines A and B both operate as motors; (c) machine B operates as a generator, and machine A as a motor; and (d) both machines A and B operate as generators.

In the light of the foregoing description, the properties of the herein described basic system representing the present invention may be summarized as follows:

With neglect of inherent power losses, the speed of the load shaft 12 is determined solely by the angle $\phi$ of the movable, or loop-adjusting, brush sets: zero to maximum forward speed is obtained by changing the movable brush angle of machine B from 0° to 180°, while that of machine A is kept at 0°; zero to maximum reverse speed is obtained by changing the movable brush angle of machine A from 0° to 180°, while that of machine B is kept at 0°.

At any speed, the magnitude and also the direction of the power flow through the system is determined by the mechanical load: if the load demands a torque, power is transmitted from the power source to the load; if the load delivers a torque, power is transmitted from the load to the power source (regenerative braking). In either case, there are no excess power losses.

When maximum torque is being delivered at maximum speed, machines A and B are both transmitting their maximum power in the same direction, thus providing maximum transducer utilization efficiency.

A set speed, determined by the angular position of the loop-adjusting brush set, will be maintained substantially constant regardless of the magnitude or direction of any load torque.

From the above it becomes apparent that the previously stated desirable Criteria have been obtained by the herein described invention.

The switch contacts which are shown in FIGS. 4 through 8, although not necessary in the operation as previously described, are important features in that these switches perform a number of functions that simplify the control and improve the performance of the basic system. It will be noted that switch operation does not introduce any undesirable jerks or discontinuities in the smooth control of the load speed at any torque.

One feature resulting from use of switch contact pairs as shown is that undesirable starting jerks of the load shaft 12 are prevented by provision of symmetrical energizing circuits through the brushes to the armatures of the machines A and B during starting. In the previous description of the operation, it will be recalled that if the D.C. supply is connected directly to the fixed brushes on one of the machines, the supply to the other armature would have to pass through more than a single set of brushes, so that the additional brush voltage drop would cause lower energization of that machine with a resulting undesirable transistory jerk in the operation of the shaft 12. However, the presence of the switch contacts permits each armature to be energized through the same number of brush pairs; consequently, during starting, the two machines come up to speed at the same rate and no transitory torque is applied to the load shaft.

Another desirable feature of the switch contact pairs is that they provide automatic connection of the D.C. supply voltage to the appropriate brush pair when the angle of one movable brush pair is changed from zero in selecting whether the shaft 12 is to operate in a forward or in a reverse direction.

The switches also accomplish a desirable function when the shaft 12 is operating at maximum speed in a forward direction. In this condition, as shown is FIG. 8, the switches on machine B again provide symmetrical energization of the two machines by bypassing the voltage drops that otherwise would exist across the brushes of machine B. The switches of machine A accomplish a similar function when the shaft is operating at maximum speed in the reverse direction.

B. Modifications and Extensions of the Basic System.
 1. Alternative brush rotation and switching configurations.

Figures 9A, 9B:
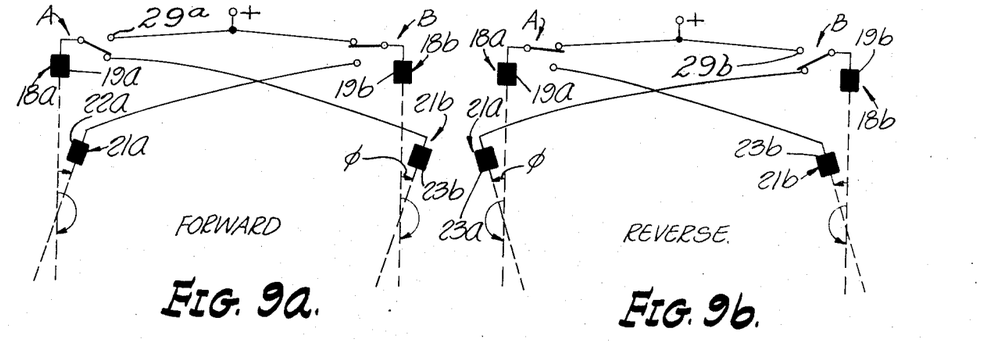
FIGS. 9a and 9b are views diagrammatically illustrating a modified switch arrangement for obtaining forward and reverse directions of rotation by simultaneous shifting of movable brush sets on mechanically interconnected dynamo-electric machines, according to the present invention.

Numerous other embodiments of switching arrangements are easily envisaged that accomplish the required functions. For example, rather than to have to rotate first one set of movable brushes through 180° and then the other set through 180° in order to control the load speed throughout its full range, as in the basic system, it may be more convenient to rotate both brush sets simultaneously through 360° and to employ suitable switching, as indicated at 29a and 29b, so that appropriate electrical connections are made to the fixed and movable brush sets in each half of the total rotation range (FIGS. 9a and 9b).

2. Extension of speed range.

a. By simultaneous rotation of reference brush pairs.

In the basic system, the reference (fixed) brush sets of each machine are in the normal position, so that the reference speed $w_r$ of each machine is the same as the normal speed $w_n$. As previously described, rotation of the brush set axis to an angle $\theta$ with respect to the normal position results in an increase in the reference speed $w_r$ according to Equation (1), and also in a proportional increase in the reference voltage $E_r$ according to Equation (2), and in the voltage V between the loop-adjusting brushes for any given value of $\phi$, according to Equation (3).

Figure 10:
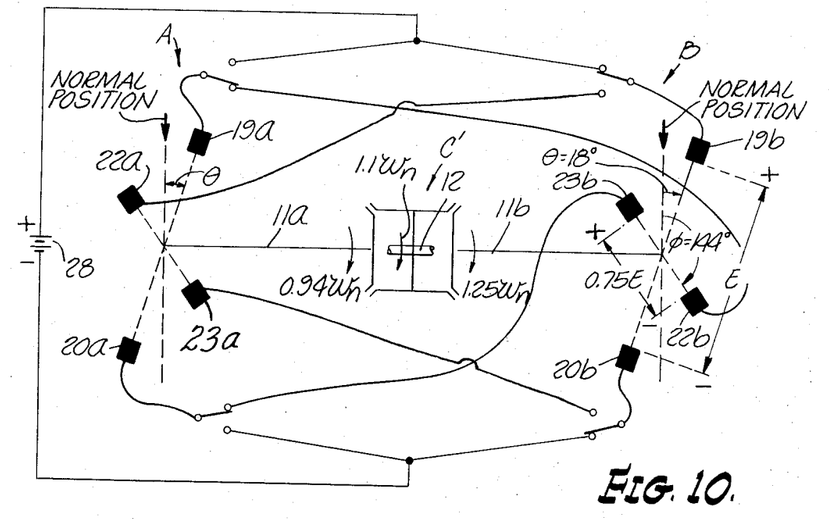
FIG. 10 is a view somewhat similar to FIGS. 9a and 9b, illustrating an arrangement whereby an extension of the speed range may be obtained.

Suppose that the interconnection method of FIGS. 9a and 9b is employed, and initially conditions are as in FIG. 7, in which the loop-adjusting brush pair 21b of machine B is set at an angle $\phi = 144°$ at which the voltage between the brushes 22b and 23b is $-0.6E$, for which the corresponding speed of shaft 12 is $0.8w_n$ in the forward direction. Now let the axes of the reference brush pairs 18a and 18b be simultaneously rotated to an angle $\theta$ from their former normal positions, as shown in FIG. 10. Suppose for illustration that $\theta = 18°$; then, according to Equations (1) through (3), the reference speed of each machine is $w_r = 1.25w_n$, the reference voltage of each machine is $E_r = 1.25E$, and the voltage between the loop-adjusting brushes 22b and 23b of machine B at $\phi = 144°$ is $V = -0.6E_r = -0.75E$. This same voltage appears across the reference brushes 19a and 20a of machine A, which are also set at an angle $\theta = 18°$ with respect to the normal position. Consequently, the speed of machine A is $-0.75 \times 1.25w_n = -0.94w_n$. The resulting speed of the load shaft is thus $(\frac{1}{2})(1.25w_n + 0.94w_n) = 1.1w_n$ compared with $0.6w_n$ obtained for the same angle $\phi$ in the basic system.

The maximum forward speed for any given value of $\theta$ is obtained when $\phi = 180°$. For example, for $\theta = 18°$ and $\phi = 180°$, the reference speed of each machine is $w_r = 1.25w_n$, the voltage applied to machine A is $V = -1.25E$, so the speed of machine A is $-1.25 \times 1.25w_n = -1.56w_n$. The resulting maximum speed of the load shaft is thus $(\frac{1}{2})(1.25w_n = 1.56w_n) = 1.41w_n$, a 41 percent increase over the maximum speed $w_n$ obtainable with the reference brush sets in the normal position.

It is clear that various combinations of the angle $\phi$ and the angle $\theta$ less than $\phi$ could be selected in the configuration of FIG. 10, so that a variety of load shaft speeds in the forward direction could be obtained (subject to the practical limitation that $\theta$ must be less than 90°). The angles $\phi$ and $\theta$ could be adjusted independently, or sequentially, or in some predetermined relation by means of suitable gearing between the riggings of the appropriate brush sets. Similar extension of the speed range in the reverse direction could, of course, be obtained.

b. By decrease of field excitation.

In the basic system, the field excitation current of each of the two machines is maintained constant at its normal (maximum) value $i_n$, thereby limiting the maximum output speed to the normal speed $w_n$ of each machine. If the two field excitation currents are simultaneously reduced by the same factor, the reference speeds are increased by the same factor according to Equation (1), and any set speed of the output shaft is likewise increased by the same factor. The angle $\phi$ and the field excitations could be adjusted independently, or sequentially, or simultaneously, in order to provide various combinations of speed and available torque.

It is to be noted that if the speed range is increased as described by either method (a) or (b), all the other features of the basic system are preserved; in particular, the system remains capable of transducing a maximum power essentially equal to the sum of the power handling capabilities of the two machines, and so high transducer utilization efficiency is retained. (Mechanical losses will be somewhat greater at higher speeds, and so the inherent power losses will be somewhat greater.)

3. Automatic increase of set speed at low torque.

If the set speed of the load shaft is increased by reduction of the field excitations as described in 2(b), the maximum torque available at the output shaft is reduced in the same proportion as the speed is increased. In some applications it is desirable to permit the set speed automatically to increase when the torque is less than maximum, and vice versa. Since, as described for the basic system, the circulating current in the connection between the brush pairs constituting the electro-mechanical loop is a measure of the torque at the output shaft, this desirable modification can be achieved by making the field excitation currents responsive to the circulating current.

Figure 11:
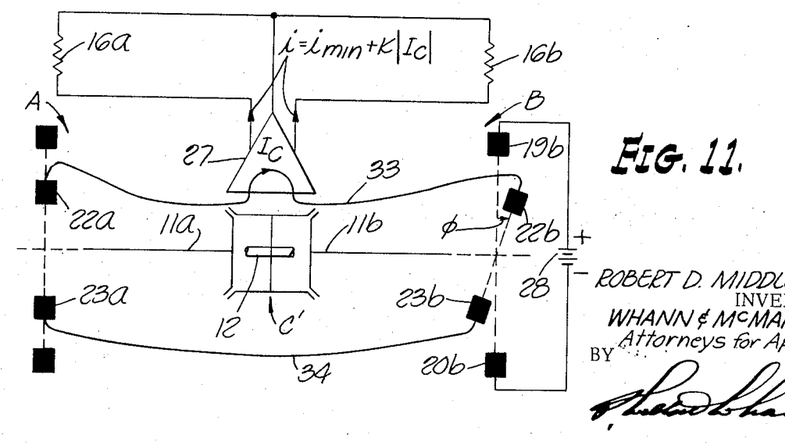
FIG. 11 is a schematic view of another modified arrangement, whereby the maximum available torque at the output shaft will be reduced proportionally to speed increases.

The necessary functional relationships are indicated in FIG. 11 in which 27 indicates a current amplifier and rectifier device of well-known construction. The excitation current $i$ for each field is the sum of a constant component $i_{min}$ and a component proportional to the magnitude of the circulating current $I_C$, regardless of the direction of $I_C$, or $i = i_{min} + K|I_C|$
where $K$ is the gain of the current amplifier.

The operation of this arrangement is as follows. When there is no torque at the output shaft 12 (regardless of the set speed), $i_C$ is zero and the field excitation current $i$ has its minimum value $i_{min}$, which is chosen less than the normal value $i_n$ to give the desired maximum factor of speed increase, as described in 2(b). However, if a torque exists at the output shaft, $I_C$ is no longer zero and $i$ is increased above its minimum value, thereby reducing the speed increase factor. The gain $K$ of the amplifier is chosen so that $i$ reaches its normal (maximum) value $i_n$ when the torque is at its maximum value.

It will be observed that the operation of this modified system is somewhat similar to that which would be achieved by use of series field windings carrying the circulating current $I_C$. There are, however, two important differences. If series windings were used, the two motors tend to "run away" when the angle $\phi$ was zero, because in this condition with no torque applied to a stationary load the field excitation would be zero. Also, at any value of $\phi$, the speed of the output shaft would be allowed to approach infinity as the torque demanded by the load approached zero, and there would be no dynamic braking effect. That is, the system would suffer from the usual disadvantages of series motors, plus the overriding defect that it would not be possible to start the machines without also applying torque to the load. The modification illustrated in FIG. 11 overcomes these disadvantages: the minimum excitation current $i_{min}$ allows the machines to be started without also applying torque to the load, when $\phi$ is zero, and prevents runaway when $\phi$ is zero. The rectifier prevents $i$ from falling below $i_{min}$, so that the load speed is limited to a maximum value determined by $i_{min}$ and the angle $\phi$ when the load torque falls to zero, and causes $i$ to increase again when $I_C$ is negative, that is, when the load torque is negative (overhauling load). Thus regenerative braking action is retained, and in fact the greater the negative torque the lower the output speed is allowed to be. For example, if the system were the motive power for a vehicle, and the vehicle were coasting downhill, the allowed speed would be smaller the steeper the hill. In contrast, if the system employed series motors, the vehicle would run away down any hill.

4. Bidirectional rotation with power source connected always to the same machine.

In the basic system, source power is restored to the electro-mechanical loop at the armature of one machine to obtain rotation of the load shaft in one direction, and at the armature of the other machine to obtain rotation in the other direction. Although in the basic system the source power is electrical, and may conveniently be connected to either machine as desired, other types of power source may be employed as will be discussed later, and with some types it may be inconvenient to change the connection point from one machine to the other. It is therefore desirable to be able to obtain rotation of the load shaft in either direction when the source power is connected always to the same machine. There are several ways in which this can be achieved.

a. Suppose for illustration that the constant-voltage D.C. electrical power is supplied to machine B at the reference brush set in the normal position. Controlled forward rotation of the load shaft is then obtained by rotation of the loop-adjusting brush set on machine B, as described for the basic system. To cause rotation of the load shaft in the reverse direction with the power source still connected to machine B, the reference speed of machine A may be increased above that of machine B. This can be accomplished in two ways: (i) the field excitation current $i$ of machine A is reduced below its normal value $i_n$; (ii) the reference brush set of machine A, electrically connected to the loop-adjusting brush set of machine B in the normal position, is rotated to an angle $\theta$ from the normal position. In either case, the speed of machine A is increased above the normal speed $w_n$, according to Equation (1), while that of machine B remains at $w_n$. Consequently, the load shaft rotates in the reverse direction.

Figure 12:
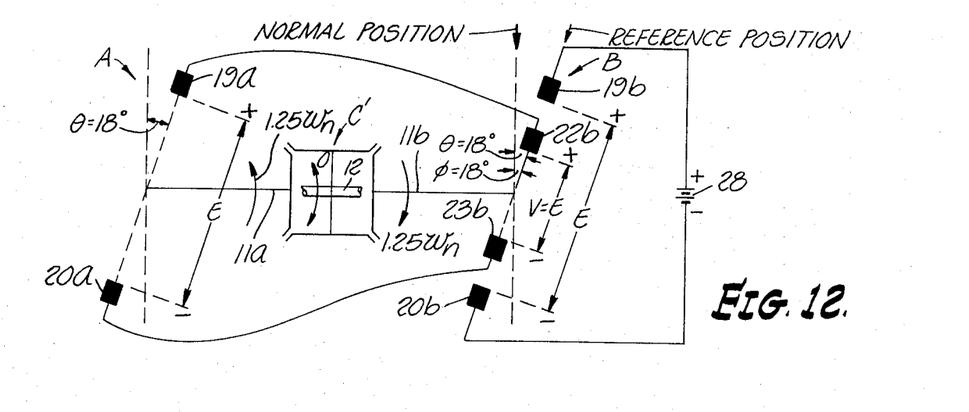
FIGS. 12, 13 and 14 are successive schematic views diagrammatically illustrating modifications wherein various ratios between maximum forward and reverse speeds are selected by changing brush angles.

If reverse rotation is obtained by increase of the reference speed of machine A above that of machine B, as in either of the two cases above, the maximum power that the system can transduce in the reverse direction is less than the sum of the power handling capabilities of the two machines. This is because, when the reference speeds are unequal, the maximum torques deliverable are also unequal and, since the actual torques in the two shafts 11a and 11b are always equal, the torque at the load shaft 12 is limited to twice the smaller of the two maximum torques, which is less than the sum of the two. This disadvantage is overcome in the modification next described.

b. Suppose that constant-voltage D.C. electrical power is supplied to machine B at the reference brush set whose axis is at an angle $\theta$ with respect to the normal position. If the axis of the reference brush set of machine A is also at the same angle $\theta$ with respect to the normal position, the reference speeds of the two machines are the same. Zero speed of the load shaft is then obtained when the axis of the loop-adjusting brush set of machine B is at an angle $\phi = \theta$ with respect to the normal position. This condition is illustrated in FIG. 12 for an assumed value $\theta = 18°$ for which, according to Equation (1), the reference speed of each machine is $w_r = 1.25w_n$ and, according to Equation (2), the reference voltage of each machine is $E_r = 1.25E$ (if the field excitation currents are at their normal values). The reference position of the axis of the loop-adjusting brush set is therefore at $\phi = \theta = 18°$.

Figure 13:
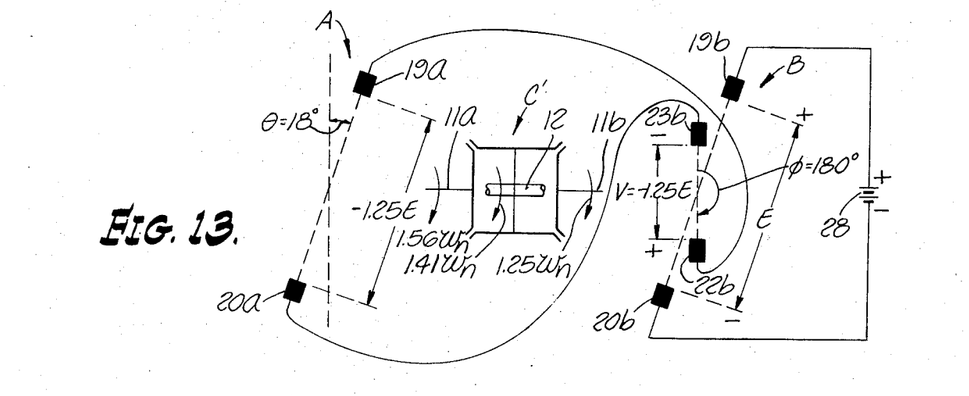

Forward rotation of the load shaft is obtained by increasing the angle $\phi$ above its reference value of 18°, since this causes the speed of machine A first to fall to zero and then to increase in the opposite direction, as explained in connection with the basic system. Maximum forward speed is obtained when $\phi = 180°$, as illustrated in FIG. 13. In this condition, the voltage applied to machine A is $V = 1.25E$, according to Equation (3), and so the speed of machine A is $-1.25 \times 1.25w_n = -1.56w_n$. Since the speed of machine B is $1.25w_n$, the corresponding maximum speed of the load shaft is $(\frac{1}{2})(1.25w_n + 1.56w_n) = 1.41w_n$.

Figure 14:
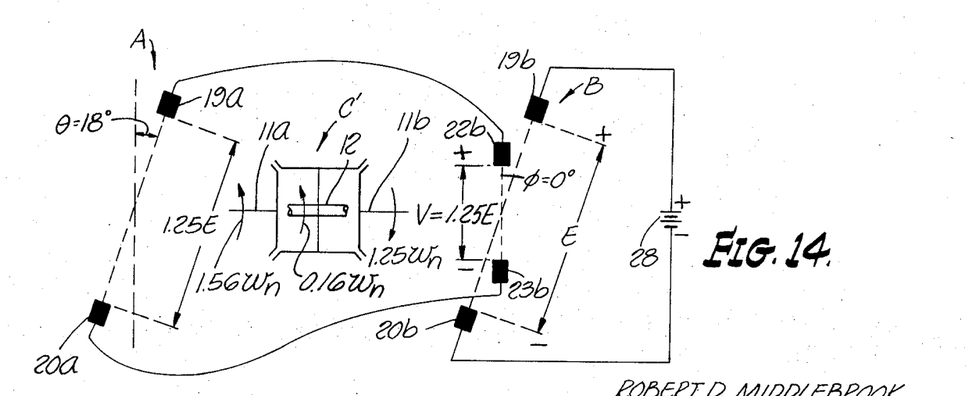

Reverse rotation of the load shaft is obtained by decreasing the angle $\phi$ below its reference value of 18°, since this causes the speed of machine A to increase above its reference value. Maximum reverse speed is obtained when $\phi = 0°$, as illustrated in FIG. 14. In this condition, the voltage applied to machine A is $V = 1.25E$, according to Equation (3), and so the speed of machine A is $1.25 \times 1.25w_n = 1.56w_n$. Since the speed of machine B is $1.25w_n$, the corresponding maximum speed of the load shaft is $(\frac{1}{2})(1.25w_n - 1.56w_n) = -0.16w_n$.

Various ratios between the maximum forward and reverse speeds can be selected by appropriate choice of the angle $\theta$. Still further flexibility in the torque-speed characteristics can be obtained by making the angle $\theta$ adjustable as well as the angle $\phi$, wherein the angles $\phi$ and $\theta$ could be adjusted independently, or sequentially, or in some predetermined relation by means of suitable gearing between the riggings of the appropriate brush sets.

It is to be noted that, as long as the angle $\theta$ is the same in both machines, that is, as long as the reference brush sets in the two machines are adjusted equally and simultaneously so that the reference speeds remain equal, all the features of the basic system are preserved even though the power source remains connected always to the same machine for either forward or reverse rotation of the load shaft. In particular, the system remains capable of transducing a maximum power essentially equal to the sum of the power handling capabilities of the two machines, so high transducer utilization efficiency is retained. Furthermore, it will be apparent from the above description that the same operational features can be obtained when the power source connected to the armature of one machine is any of the various types to be discussed later.

5. Other power sources.

The smooth control feature of the basic system is achieved by means of the continuously adjustable electro-mechanical loop configuration. Mechanical power delivered from this loop to the load shaft must, of course, be supplied to the loop from a power source. As previously described, when power is extracted from the loop at the load shaft 12, power is restored to the loop in mechanical form at the armature of one of the machines. However, the direction of power flow is automatically reversible: if the load connected at the load shaft is overhauling, power is delivered to the loop and can be extracted at the armature of the machine connected to the power source. Throughout the previous descriptions, therefore, the term "power source" is to be construed as meaning a "power source or sink" in that it is capable of absorbing as well as delivering power, and the term "load" is to be construed as meaning a mechanical load connected to the shaft 12 that may deliver as well as absorb mechanical power.

With recognition that the direction of power flow through the system could be in either direction, it is seen that one machine performs two functions: it is an element in the electro-mechanical loop, and it is the means through which the power source is connected to the loop. In the basic system, the second function is achieved by causing the machine to act as a motor or generator by virtue of connection to a constant-voltage D.C. source through an additional brush set. Thus, the same armature carries both the current circulating in the electro-mechanical loop, and the net current drawn from or returned to the power source.

Although the first function of the machine is inherent in the present invention, the second function can be realized in numerous other ways. Although power can be connected to the armature either by electrical or mechanical means, a more significant distinction is whether the external power source is or is not capable of absorbing as well as delivering power. Suitable means for connecting power to the armature may therefore be classified under two headings, as follows:

a. External power sources capable of absorbing as well as delivering power.
  i. A set of slip rings and engaging brushes connected to appropriate commutator segments permits power to be connected to the armature from a single-phase or poly-phase A.C. electrical source. The machine then operates as a synchronous A.C. converter.
  ii. Power can be connected to the armature in mechanical form directly at the shaft, where the shaft is connected externally to the system to a dynamo-electric machine operated in in conjunction with any desired D.C. or A.C. electrical source.

b. External power sources capable only of delivering power.
  i. D.C. power can be supplied to the armature from an A.C. power source through a unidirectional rectifier circuit.
  ii. Power can be supplied to the armature in mechanical form directly at the shaft, where the shaft is connected externally to the system to a prime mover such as a gasoline, diesel, or turbine engine.

It can be seen that the operation features of the basic system and the various modifications so far described are all retained if the external power source is capable of absorbing as well as delivering power; in particular, regenerative braking automatically occurs in the presence of an overhauling load.

All the operation features are also retained if the external power source is capable only of delivering power, as long as power is being absorbed by the load. However, when power is being returned to the loop by an overhauling load, some alternative means of removing this power from the loop must be provided in order to maintain a dynamic braking action. A method of achieving this end is discussed as the next modification of the basic system.

6. External power source capable only of delivering power.

Figure 15:
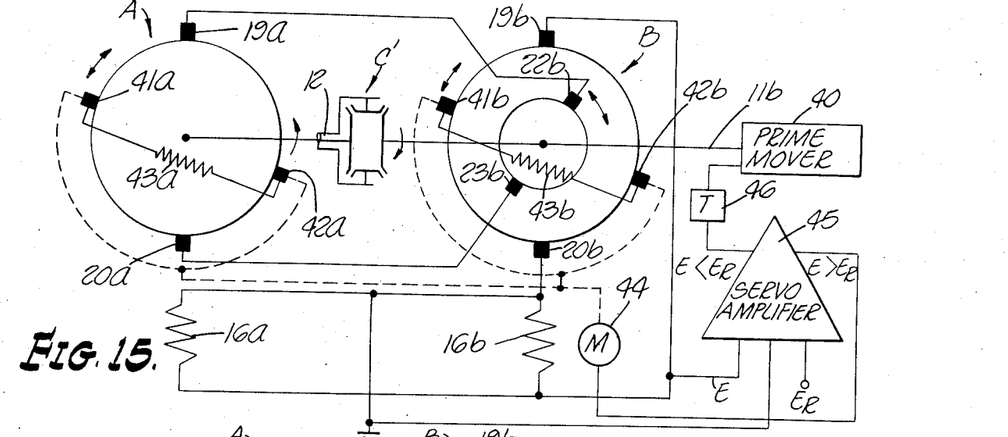
FIG. 15 is a view schematically illustrating another modification in which several controls are included for the prime mover, and provision made for dissipation of regenerated power in resistor elements.

A system in which the external power source is a prime mover is shown in FIG. 15. The prime mover is connected directly with the shaft 11b of machine B. In this embodiment, the voltage at the reference brush set of machine B in the normal position energizes the field windings of both machines, and the loop-adjusting brushes of machine B are connected to the reference brushes of machine A. Since the prime mover is not capable of absorbing regenerated power, an additional set of movable brushes 41b and 42b is provided on machine B, these brushes being connected to a resistor 43b. Similarly, movable brushes 41a and 42a with a connected resistor 43a may be provided on machine A. The axes of these two sets of brushes are arranged to occupy a 90° position with respect to the normal position on each machine, but are movably adjustable from this position by means of an actuating motor 44 or other suitable means.

Substantially constant speed of the prime mover is obtained by means of a servo mechanism which includes a servo amplifier 45 arranged to monitor the voltage E between the reference brushes 19b and 20b of machine B. This voltage is compared with a constant standard or reference voltage $E_r$, which is the value of the voltage E appearing at the reference brushes when the machine B and prime mover are operating at the required constant normal speed. If the rotation speed drops, E falls below $E_R$ and the servo mechanism then automatically opens the throttle T, as indicated at 46, in order to restore the speed essentially to normal. This automatic adjustment occurs whenever power is being delivered to a mechanically connected load. The axes of brush sets 41a, 42a, and 41b, 42b remain at $\phi = 90°$ so, by Equation (3), the voltage V between each pair is zero and so no power is dissipated in the resistors 43a and 43b.

A different operation occurs if the mechanical load is to be braked. Then, the speed of machine B and the prime mover would tend to increase above normal, and the voltage E would rise above $E_R$. Under this condition the throttle 46 is not opened, and the servo mechanism then energizes the motor 44 so as to cause the connected movable brushes 41a, 42a, and 41b, 42b of machines A and B simultaneously to move from their 90° positions. When the angle of the brush axis differs from 90°, a voltage V appears across each set of brushes, according to Equation (3), and power is dissipated in the connected resistors. The degree of deviation from the 90° position is proportional, by virtue of the servo amplifier, to the machine B speed excess above normal speed. A braking torque is thus exerted on the mechanical load so that its speed does not appreciably exceed the speed determined by the position of the loop-adjusting brush set 22b and 23b of machine B.

It will be apparent that the various modifications previously described may also be incorporated.

A system as described above is useful in installations such as electric trains with on-board power plant, and as a transmission in trucks and automobiles.

7. Hybrid power source.

Figure 16:
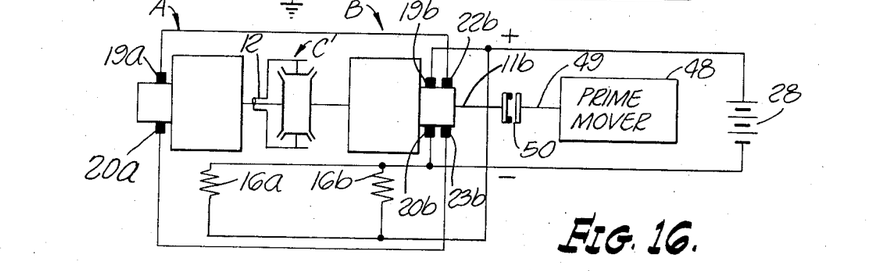
FIG. 16 is a view schematically illustrating still another modification in which one of the dynamo-electric machines is coupled with a separate prime mover power source.

A system which contains a power source capable of both absorbing and delivering power and a second power source capable only of delivering power is shown in FIG. 16. The first power source is represented as a constant-voltage battery 28, connected as in the basic system, and the second power source is represented as a prime mover 48 whose shaft 49 may be selectively coupled by suitable means, such as a clutch 50, with the shaft of one of the machines, in this case the shaft 11b of machine B. The shaft of B rotates at substantially constant speed, regardless of the speed of the load shaft 12, as in the basic system.

If no power is required by the load, the mechanical output power of the prime mover is converted to electrical power by machine B operating as a generator, and recharges the battery 28. If power is required by the load, the necessary power input to the electro-mechanical loop may be obtained from the battery and the prime mover in any desired proportion. If power is delivered by an overhauling load, this power in addition to that of the prime mover is available to recharge the battery.

It will be apparent that the various modifications previously described may also be incorporated.

A hybrid system as described above is useful, for example, in an electric automobile.

8. Unsymmetric systems.

In the descriptions of the basic system and the foregoing modifications it has been assumed that the two machines A and B that constitute essential elements in the electro-mechanical loop are substantially identical. However, all the desired performance features may be obtained even if the machines are not identical, as long as their power handling capabilities are equal. If they are unequal, all the performance features could be obtained except maximum transducer utilization efficiency, since then the maximum power that could be transduced would be twice the lower maximum power, which is less than the sum of the two maximum powers if they are unequal.

For example, if the normal speeds of the two machines are different, an unsymmetric differential gear (or a planetary gear) would be used with ratios such that the speed of the load shaft is zero when the two machines rotate at their respective normal speeds.

It has further been assumed in the preceding descriptions that A and B are two-pole machines. It is obvious that multi-pole construction could equally well be employed, and so all references in the preceding descriptions to "degrees" of rotation of brush sets are to be construed as references to "electrical degrees" rather than to "mechanical degrees".

9. Dual output systems.

Figure 17:
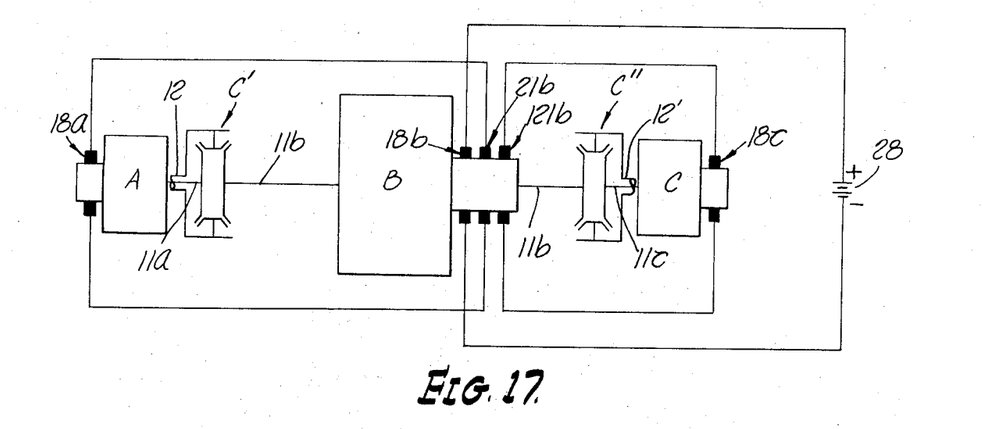
FIGS. 17 and 18 are schematic views respectively diagrammatically illustrating modified arrangements for obtaining dual output systems.

An extension of the basic system to embody two linked electro-mechanical loops with two load shafts is shown in FIG. 17. The arrangement is essentially a combination of two systems each having the power source connected to one machine, as described in Modification 4, in which machine B is the machine to which the power source is connected and is common to both loops. For convenience, the power source is shown to be a constant-voltage D.C. electrical source connected to the reference brush set 18*b* of machine B. Machine B also carries two independently movable loop-adjusting brush sets 21*b* and 121*b*, one for each loop. The brush set 21*b* is loop connected with the brush set 18*a* of machine A and the brush set 121*b* is loop connected with the brush set 18*c* of machine C.

It is clear that the operation characteristics of each loop can be made the same as those of the single-loop systems previously described, if the power handling capability of machine A is the same as that of machine C, and that of B is twice that of A or C, so that the maximum power that can be transduced is the sum of the maximum power capabilities of the three machines. The speed of each load shaft is independently adjustable by means of the corresponding loop-adjusting brush set on machine B. That is, shaft 12 by brush set 21*b*, and shaft 12' by brush set 121*b*.

A dual output system as described above is useful, for example, in providing independent control of the speed of a pair of driving wheels on a vehicle. A particular advantage is that the independent control can be used for steering; in fact, since the output shafts are also independently reversible, the vehicle can be made to turn in its own length.

Figure 18:
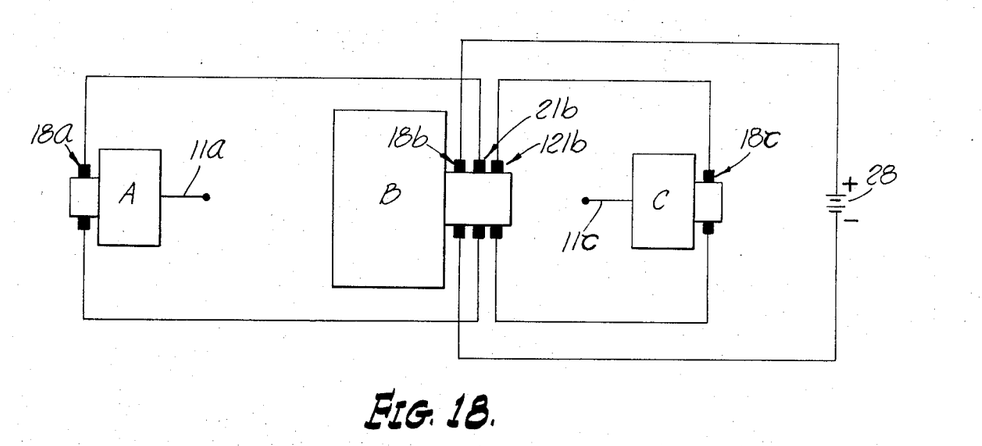

A simpler form of the dual output system of FIG. 17 is shown in FIG. 18. The electro-mechanical loops no longer exist since the differential gears are omitted. Instead, the two mechanical outputs are obtained directly at the shafts 11*a* and 11*c* of machines A and C. Otherwise, the arrangement is the same as in FIG. 17 except that zero output speed of each shaft is obtained when the angle of the axis of the appropriate movable brush set on machine B is at 90° with respect to the normal position, rather than when in the reference position. If the movable brush sets are independently adjustable, independent control of the speed of each output shaft can be obtained in either direction. However, the penalty for omission of the differential gears in the system of FIG. 18 is that the maximum power that can be transduced is only half that for the system of FIG. 17.

Extension of the systems of FIG. 17 or FIG. 18 to more than two mechanical outputs is obvious.

From the foregoing description and drawings, it will be clearly evident that the delineated objects and features of the invention are accomplished.

Various modifications may suggest themselves to those skilled in the art without departing from the spirit of my invention and, hence, I do not wish to be restricted to the specific forms as shown or uses as mentioned.

I claim:

1. Power converting system for delivering output mechanical power at continuously variable controllable speed, comprising in combination two dynamo-electric machines, designated A and B, each having a magnetic field structure, a rotor including a commutator and an armature winding connected to the commutator, and at least a first set of brushes engaging the commutator, an output shaft subject to a variable load torque, coupling mechanism equivalent to planetary gearing interconnecting the two machines rotors and the output shaft, a source of electrical power at substantially constant D.C. supply voltage, the source being capable of both absorbing and delivering power, means for producing normally constant magnetic fields in the respective field structures, circuit means connecting said first brush set of the B machine as reference brush set to the power source to normally maintain forward operation of that machine at a substantially uniform normal speed corresponding to the supply voltage, a set of control brushes engaging the commutator of the B machine and mounted for angular movement with respect to the field structure to derive from the commutator a controllably variable D.C. voltage, electrical connections between the control brush set of the B machine and the first brush set of the A machine forming a loop circuit for applying the variable voltage to the armature of the A machine to maintain rotation thereof at a speed that varies in direct correspondence to said applied voltage, and control means for controllably setting the control brush set at any selected angular position within a predetermined angular range to establish a corresponding speed of the A machine.

2. Power converting system as defined in claim 1, and in which the two dynamo-electric machines have substantially equal power handling capabilities and have respective normal speeds of rotation in response to the supply voltage, said coupling mechanism comprising planetary gearing having a speed ratio such that zero speed of the output shaft is produced by ration of the machines at their respective normal speeds.

3. Power converting system as defined in claim 1, and in which said range of movement of the control brush set includes a neutral position electrically aligned with said first brush set of the B machine, said system including mechanism acting in response to aligned position of the control brush set to connect the power source to a brush set of the A machine, bypassing the brushes of the B machine.

4. Power converting system as defined in claim 1, and in which said first brush set of the B machine has a normal position at the electrical null position with respect to the field structure, said control brush set is continuously adjustable between a position aligned with said first brush set of the B machine and a position spaced 180 electrical degrees therefrom, said system including switch mechanism acting in response to presence of the control brush set at the aligned position and at the 180°-position to supply D.C. power in corresponding respective polarities from said source to a brush set of the A machine, bypassing the brushes of the B machine.

5. Power converting system as defined in claim 1, and including a set of control brushes mounted on the A machine for relative angular movement with respect to the field structure, said circuit means and said electrical connections including switch mechanism shiftable between forward and reverse conditions, the switch mechanism acting when in forward condition to produce the said circuit connections, and acting when in reverse condition to produce corresponding circuit connections with the two machines interchanged.

and said control means comprising means for varying the position of the control brush set of the B machine when the switch mechanism is in forward condition and for varying the position of the control brush set of the A machine when the switch mechanism is in reverse condition.

6. Power converting system as defined in claim 5, and in which said circuit means and switch mechanism act in forward condition of the switch mechanism to connect the power source to said first brush set of the B machine and act in reverse condition of the switch mechanism to connect the power source to said first brush set of the A machine, and said electrical connections connect the control brush set of the B machine to the control brush set of the A machine in both conditions of the switch mechanism.

7. Power converting system as defined in claim 5, and in which said circuit means and switch mechanism act in forward condition of the switch mechanism to connect the power source to said first brush set of the B machine and act in reverse condition of the switch mechanism to connect the power source to said first brush set of the A machine, and said electrical connections and switch mechanism act in forward condition of the switch mechanism to connect the control brush set of the B machine to said first brush set of the A machine, and act in reverse condition of the switch mechanism to connect the control brush set of the A machine to said first brush set of the B machine, said control means comprising means for simultaneously and correspondingly varying the positions of the control brush sets of the A machine and the B machine in both said conditions of the switch mechanism.

8. Power converting system as defined in claim 1, and including means mounting said first brush sets on their respective machines for angular movement relative to the field structures, and auxiliary control means for varying the angular positions of the first brush sets on both machines simultaneously and equally.

9. Power converting system as defined in claim 8, and in which said first brush sets have normal positions aligned with the electrical null positions of their respective machines, and are movable therefrom to increase the output shaft speed that corresponds to each position of the control brush set.

10. Power converting system as defined in claim 1, and in which said first brush sets have normal positions angularly spaced from the electrical null positions of their respective machines, said control brush set has a neutral position for which the output shaft has substantially zero speed, and said control means include means for moving the control brush set angularly from neutral position in one direction to produce forward shaft rotation and in the other direction to produce reverse shaft rotation.

11. Power converting system as defined in claim 1, and including a source of mechanical power coupled to the rotor of the B dynamo-electric machine to maintain forward operation thereof, and speed control mechanism for the power source for maintaining the machine speed at such value that the reference brush set develops a D.C. voltage approximately corresponding to said supply voltage.

12. Power converting system as defined in claim 1, and including an auxiliary set of brushes on at least one of said machines mounted for angular movement with respect to the field structure thereof, electrical resistance means connected between the brushes of the auxiliary brush set, means for normally maintaining the auxiliary brush set at electrical null position, and means for shifting the auxiliary brush set away from null position to dynamically brake the load.

13. Power converting system for converting input power to mechanical output power at a continuously and controllably variable speed, comprising in combination two dynamo-electric machines, each having a magnetic field structure, a rotor including a commutator and an armature winding connected to the commutator, and a set of brushes engaging the commutator and mounted for angular movement relative to the field structure, an output shaft subject to a variable load torque, coupling mechanism equivalent to planetary gearing interconnecting the two machine rotors and the output shaft, means for producing normally constant magnetic fields in the respective field structures, circuit means interconnecting the brush sets of the respective machines to form a loop circuit, input power means selectively applicable to one machine for driving the output shaft in the forward direction and to the other machine for driving the output shaft in the reverse direction, and control mechanism for applying the power means to a selected machine to establish the output shaft direction, and for controllably setting the angular position of the brush set of the machine to which the power means is applied to establish the value of the output speed.

14. Power converting system comprising in combination three dynamo-electric machines, each having a magnetic field structure, a rotor including a commutator and an armature winding connected to the commutator, input power means for normally maintaining rotation of the rotor of one machine, two output shafts, coupling mechanism equivalent to planetary gearing interconnecting the rotor of each of the other machines with one of the output shafts and with the rotor of said one machine, two independently rotatable brush sets operatively associated with the commutator of said one machine, a set of brushes operatively associated with the commutator of each of said other machines, circuit means interconnecting the brush sets of the other machines with the respective brush sets of said one machine, and control mechanism for independently setting the two brush sets of said one machine at selected positions.

* * * * *